United States Patent
Allen et al.

(10) Patent No.: US 10,738,961 B1
(45) Date of Patent: Aug. 11, 2020

(54) COLORED LIGHT ASSEMBLY FOR AN AUTOMOTIVE VEHICLE

(71) Applicant: GM GLOBAL TECHNOLOGY OPERATIONS LLC, Detroit, MI (US)

(72) Inventors: Jodi M. Allen, Orion, MI (US); Martin J. Davis, Royal Oak, MI (US); Carlos N. Czirmer, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/587,657

(22) Filed: Sep. 30, 2019

(51) Int. Cl.
| | |
|---|---|
| *B60Q 1/26* | (2006.01) |
| *F21S 43/20* | (2018.01) |
| *F21S 43/14* | (2018.01) |
| *F21S 43/31* | (2018.01) |
| *F21S 43/40* | (2018.01) |
| *B60Q 1/34* | (2006.01) |
| *B60Q 1/44* | (2006.01) |
| *F21W 103/20* | (2018.01) |
| *F21W 103/35* | (2018.01) |
| *F21Y 115/10* | (2016.01) |

(52) U.S. Cl.
CPC ............ *F21S 43/26* (2018.01); *B60Q 1/2607* (2013.01); *B60Q 1/346* (2013.01); *B60Q 1/44* (2013.01); *F21S 43/14* (2018.01); *F21S 43/31* (2018.01); *F21S 43/40* (2018.01); *B60Q 1/343* (2013.01); *B60Q 1/441* (2013.01); *F21W 2103/20* (2018.01); *F21W 2103/35* (2018.01); *F21Y 2115/10* (2016.08)

(58) Field of Classification Search
CPC ...... B60Q 1/0041; B60Q 1/26; B60Q 1/2607; B60Q 1/2696; B60Q 1/302; F21S 41/322; F21S 43/237
USPC .............................. 315/77, 82; 362/487, 509
See application file for complete search history.

(56) References Cited

U.S. PATENT DOCUMENTS

| | | | | |
|---|---|---|---|---|
| 2004/0004840 | A1* | 1/2004 | Machida ............... | B60Q 1/2607 362/487 |
| 2006/0133103 | A1* | 6/2006 | Muhlbaier ............... | B60Q 1/38 362/545 |
| 2006/0146555 | A1* | 7/2006 | Inaba .................... | B60Q 1/2665 362/494 |
| 2010/0327747 | A1* | 12/2010 | Harris ................... | B60Q 1/2607 315/77 |
| 2011/0156588 | A1* | 6/2011 | Brant .................... | G09F 13/005 315/77 |

\* cited by examiner

*Primary Examiner* — Tung X Le

(57) ABSTRACT

An automotive vehicle includes a body, a housing disposed on the body, and an exterior lens coupled to the housing defining a cavity therebetween. The vehicle additionally includes an interior lens disposed in the cavity. The exterior and interior lenses have distinct first and second colors, respectively. The vehicle also includes a reflector disposed in the cavity. The reflector has an at least partially reflective coating disposed thereon and is positioned to reflect light from the interior lens and to the exterior lens. The vehicle further includes first and second light sources configured to emit light having a third color. The first light source is oriented to direct light through the exterior lens without passing through the interior lens, and the second light source is oriented to direct light through the interior lens, reflect from the reflector, and subsequently through the exterior lens.

16 Claims, 2 Drawing Sheets

COLORED LIGHT ASSEMBLY FOR AN AUTOMOTIVE VEHICLE

INTRODUCTION

The present invention relates generally to lamp assemblies, and more specifically to lamp assemblies for use in automotive vehicles.

Vehicles, such as cars, trucks, motorcycles, aircraft, trains, or other vehicles, are typically equipped with a lighting system to provide interior and exterior illumination for the vehicle operator. Such lighting systems include an array of lamp assemblies that are mounted or integrated to the front, sides and rear of the vehicle. These lamp assemblies are arranged to provide exterior illumination for the driver to safely operate the vehicle in low-light conditions, such as nighttime driving, and to increase the conspicuity of the vehicle. Such lighting systems also display information about the vehicle's presence, position, size, direction of travel, as well as providing signaling functions to indicate the operator's intended maneuvering of the vehicle.

Road vehicles are equipped with rear brake lights that illuminate upon actuation of the vehicle brake system to indicate that the vehicle is slowing or stopping. Generally fitted in multiples of two, symmetrically at the left and right edges of the vehicle rear, the brake lights are red, steady-burning lamps that are activated when the driver applies pressure to the brake pedal. Many automobiles are also equipped with a central brake lamp that is mounted higher than the vehicle's traditional left and right brake lamps. The central brake lamp is known as a center high-mounted stop lamp (CHMSL). The CHMSL is intended to provide a deceleration warning to following drivers whose view of the vehicle's regular stop lamps is blocked by interceding vehicles.

In addition, road vehicles are equipped with turn signal lights that illuminate upon activation of a turn signal to indicate that the vehicle operator intends to turn or change lanes. Generally fitted in multiples of two, symmetrically at the left and right edges of the vehicles front and rear, the turn signal lights are blinking lamps, typically amber or red, that are activated when the operator activates a turn signal, e.g. by moving a control knob.

In addition to the above-mentioned brake light and turn signal light assemblies, vehicles may also be equipped with a variety of other light assemblies, including front-mounted headlamps having low- and high-beams, daytime running lights, and parking lights. Such light assemblies may be configured to emit light in various colors according to regulation, convention, and/or styling.

SUMMARY

An automotive vehicle according to the present disclosure includes a body, a housing disposed on the body, and an exterior lens coupled to the housing defining a cavity therebetween. The exterior lens has a first color. The vehicle additionally includes an interior lens disposed in the cavity. The interior lens having a second color distinct from the first color. The vehicle also includes a reflector disposed in the cavity. The reflector has an at least partially reflective coating disposed thereon and is positioned to reflect light from the interior lens and to the exterior lens. The vehicle further includes first and second light sources configured to emit light having a third color. The first light source is oriented to direct light through the exterior lens without passing through the interior lens, and the second light source is oriented to direct light through the interior lens, reflect from the reflector, and subsequently through the exterior lens.

In an exemplary embodiment, the first color is red and the second color is green, such that light emitted through the interior lens, reflected from the reflector, and subsequently through the exterior lens is emitted as amber. Such embodiments may include a controller in communication with the first light source and the second light source, with the controller being configured to automatically activate the first light source independently from the second light source in response to a vehicle brake system being activated, and to automatically activate the second light source independently from the first light source in response to a vehicle turn signal being activated.

In an exemplary embodiment, the vehicle includes at least one bezel disposed in the housing. The bezel divides the cavity into a first chamber and a second chamber, with the first light source being disposed in the first chamber, the second light source being disposed in the second chamber, and the reflector being disposed in the second chamber. The reflector and a respective bezel of the at least one bezel may define a contiguous body.

In an exemplary embodiment, the reflector and the second lens define a contiguous body, with a portion of the second lens defining a substrate of the reflector.

A lighting assembly according to the present disclosure includes a housing, a first lens, a second lens, a first light source, and a reflector. The first lens is coupled to the housing to define a cavity therebetween. The second lens disposed in the cavity. The first lens has a first color, and the second lens has a second color which is distinct from the first color. The first light source is disposed in the housing and is configured to emit light having a third color. The light source is oriented to direct light through the second lens. The reflector is disposed within the housing. The reflector has an at least partially reflective coating disposed thereon, and is positioned to reflect at least a portion of light from the second lens through the first lens.

In an exemplary embodiment, the first color is red and the second color is green, such that the portion of light from the light source reflected through the first lens is amber.

In an exemplary embodiment, the assembly additionally includes a second light source coupled to the housing. The second light source is arranged to emit light through the first lens without passing through the second lens. Such embodiments may include at least one bezel disposed in the housing, with the bezel dividing the cavity into a first chamber and a second chamber. In such embodiments, the reflector is disposed in the first chamber, and the second light source is disposed in the second chamber. The first light source may be disposed in the first chamber.

In some embodiments, a controller is in communication with the first light source and the second light source. The controller is configured to automatically activate the first light source independently from the second light source in response to a first operating condition, and to automatically activate the second light source independently from the first light source in response to a second operating condition. In embodiments where the lighting assembly is disposed on an automotive vehicle, the first operating condition may include a turn signal of the automotive vehicle being activated, and the second operating condition may include a brake system of the automotive vehicle being engaged.

A method of controlling a light system according to the present disclosure includes providing a housing, an exterior lens coupled to the housing to define a cavity therebetween, an interior lens disposed in the cavity, a reflector disposed in the cavity, a first light source disposed in the cavity, a second light source in the cavity, and a controller in communication with the first light source and the second light source. The exterior lens has a first color and the interior lens has a second color distinct from the first color. The method additionally includes, in response to a first operating condition, automatically controlling the first light source, via the controller, to emit light through the exterior lens without passing through the interior lens. The method further includes, in response to a second operating condition, automatically controlling the second light source, via the controller and independently from the first light source, to emit light through the interior lens, reflect from the reflector, and subsequently through the exterior lens.

In an exemplary embodiment, the method additionally includes disposing the housing on an automotive vehicle. The first operating condition includes a turn signal of the automotive vehicle being activated, and the second operating condition includes a brake system of the automotive vehicle being engaged.

In an exemplary embodiment, the first color is red and the second color is green, such that light emitted through the interior lens, reflected from the reflector, and subsequently through the exterior lens is emitted as amber.

Embodiments according to the present disclosure provide a number of advantages. For example, the present disclosure provides a system and method for providing multiple colors of lighting through a single colored lens, enabling satisfaction of design criteria and providing a pleasing appearance.

The above advantage and other advantages and features of the present disclosure will be apparent from the following detailed description of the preferred embodiments when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
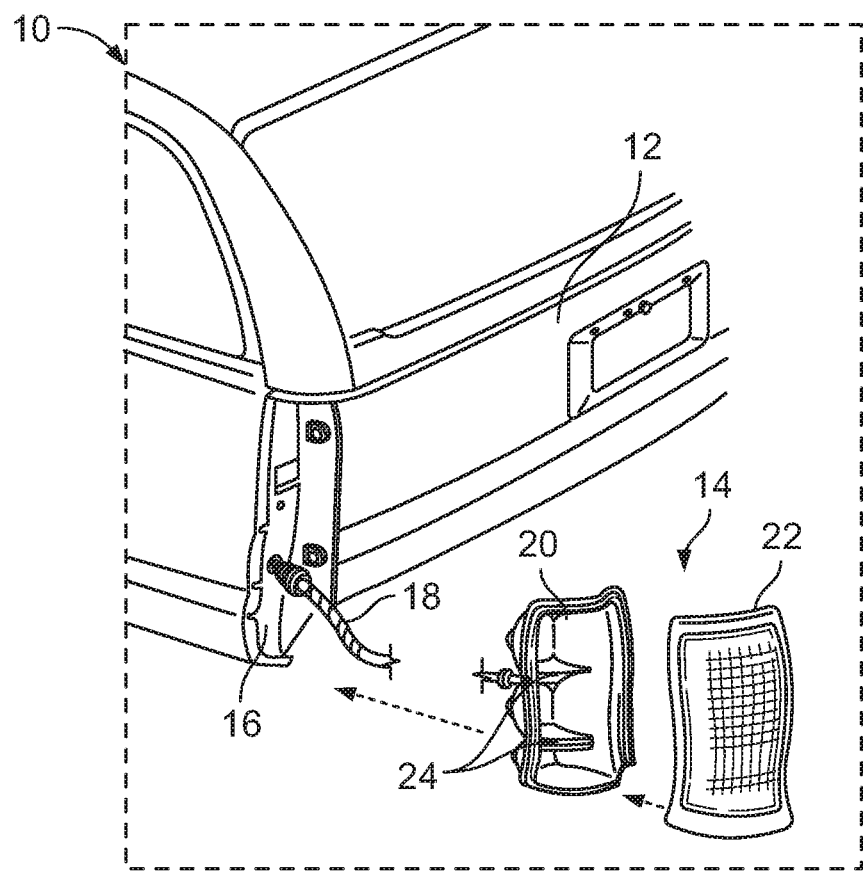
FIG. 1 is a partial exploded view of an automotive vehicle according to an embodiment of the present disclosure.

Referring now to FIG. 1, an automotive vehicle 10 according to the present disclosure has a body 12. The vehicle 10 is provided with a plurality of external light assemblies, including a rear light assembly 14. The body 12 has a receptacle 16 within which the rear light assembly 14 is disposed. The receptacle 16 includes a wiring harness 18 for selectively providing power to the rear light assembly 14.

The rear light assembly 14 includes a housing 20 and an exterior lens 22. The housing 20 and lens 22 cooperatively define a cavity, which may be separated into two or more compartments by internal dividers or bezels 24. A plurality of light sources may be disposed in the compartments and selectively illuminated in response to different operating conditions, as will be discussed in further detail below. While depicted in this embodiment as a discrete unit separate from the body 12, in other embodiments the housing 20 may be defined by features formed directly in the body 12.

In this exemplary embodiment, the rear light assembly 14 is configured to provide both red light in response to activation of brakes and amber light in response to activation of a turn signal. In conventional light assemblies, this function would be satisfied by providing an exterior lens having red and amber portions for the red and amber lights, respectively. However, for styling purposes it may be preferable to utilize a single exterior lens of a consistent color tint, e.g. red.

Figure 2:
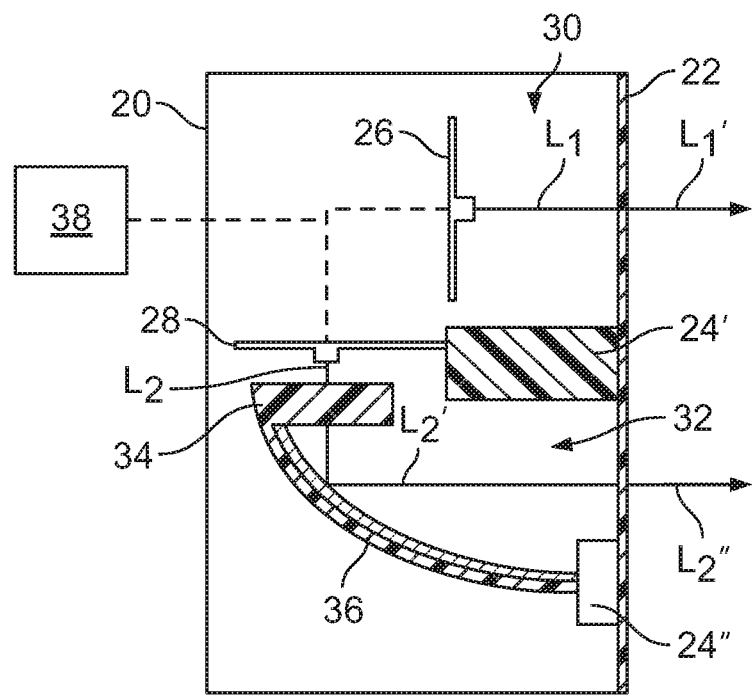
FIG. 2 is a schematic representation of a lighting assembly according to an embodiment of the present disclosure.

Referring now to FIG. 2, the light assembly 14 is shown schematically. A first light source 26 and a second light source 28 are disposed within the housing 20. In an exemplary embodiment, the first and second light sources 26, 28 comprise white LEDs; however, in other embodiments other colors and/or kinds of light sources may be utilized.

A first bezel 24' divides the interior of the housing 20 into a first chamber 30 for the first light source 26 and a second chamber 32 for the second light source 28. The first bezel 24' provides a light barrier to inhibit undesired light leakage between the chambers 30, 32. A second bezel 24" is provided in the second chamber 32 to likewise inhibit undesired light leakage, as will be discussed in further detail below.

In the illustrated embodiment the bezels 24', 24" do not extend the full depth of the housing 20, such that the chambers 30, 32 are in communication with one another. However, other embodiments may comprise fully separated chambers, a larger number of bezels to subdivide a larger number of chambers, or both.

The first light source 26 is oriented to emit light $L_1$ directly through the external lens 22. In an exemplary embodiment, the light $L_1$ is white or broadband light. In an exemplary embodiment, the lens 22 comprises a red-colored material, such as tinted polycarbonate (PC) or poly(methyl methacrylate) (PMMA), such that the light $L_1'$ is emitted from at least a portion of the lens with a red color. However, in other embodiments the external lens 22 may have a color other than red. As used herein, "color" is defined by a range or ranges of wavelengths contained within a given beam of light or transmitted through a given lens. In some embodiments, the lens 22 may comprise a combination of transmissive and opaque regions, e.g. by providing an opaque portion about the periphery of the external lens 22. In such embodiments, the opaque regions may be formed in any suitable manner, e.g. via multi-shot molding or through application of a surface coating.

An internal lens 34 is provided within the second chamber 32. The internal lens 34 may be flat, or may be provided with focusing features if desired for a given embodiment. The internal lens 34 has a different color from that of the external lens 22. In an exemplary embodiment, the internal lens 34 comprises a green-colored material, such as tinted PC or PMMA. In other embodiments the internal lens 34 may have a color other than green.

A reflector 36 is also provided within the second chamber 32. The reflector 36 comprises a substrate with a partially- or fully-metalized reflective coating. In the illustrated embodiment, the substrate of the reflector 36 and the internal lens 34 form a contiguous body. In such embodiments, the internal lens 34 and substrate may be co-molded out of a single material in a one-shot molding process, or out of multiple materials in a multi-shot molding process. In such embodiments, the internal lens 34 may comprise a first material and the substrate may comprise a second material. In other embodiments, the internal lens 34 and reflector 36 may be separate, discontiguous components.

One or both of the bezels 24', 24" may likewise be formed as contiguous bodies with the internal lens 34 and/or the reflector 36, in generally the same fashion. The bezels 24', 24" may likewise be co-molded with the internal lens 34 and/or the reflector 36 out of a single material in a one-shot molding process, or out of multiple materials in a multi-shot molding process. In other embodiments, one or both of the bezels 24', 24" may be separate, discontiguous components from the internal lens 34 and reflector 36.

The second light source 28 is oriented to emit light $L_2$ through the internal lens 34. In an exemplary embodiment, the light $L_2$ is white or broadband light. In the exemplary embodiment where the internal lens 34 comprises a green-colored material, light $L_2'$ is emitted from the internal lens 34 with a green color. The light $L_2'$ thereafter reflects from the reflector 36, and subsequently through the lens 22. In the exemplary embodiment having a green internal lens 34 and a red lens 22, the light $L_2''$ is therefore emitted from the lens 22 with an amber color, e.g. having a wavelength between approximately 575 and 595 nm.

As will be appreciated by one of ordinary skill in the art, the configuration illustrated in FIG. 2 is a simplified schematic. As such, the relative position, shape, orientation, or scale of the illustrated features may vary significantly in production embodiments. Moreover, additional features such as further lenses or reflectors may be provided as appropriate for a given configuration. In addition, other lens color combinations may be used, including providing one of the lenses 22, 34 as a clear lens. These and other minor variations are contemplated within the scope of the present disclosure.

The first light source 26 and second light source 28 are under the control of a controller 38. The controller 38 is configured to selectively and independently activate or deactivate the light sources 26, 28 in response to various operating conditions, as will be discussed in further detail below with respect to FIG. 3. While depicted as a single unit, the controller 38 may include one or more additional controllers collectively referred to as a "controller." The controller 38 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

Figure 3:
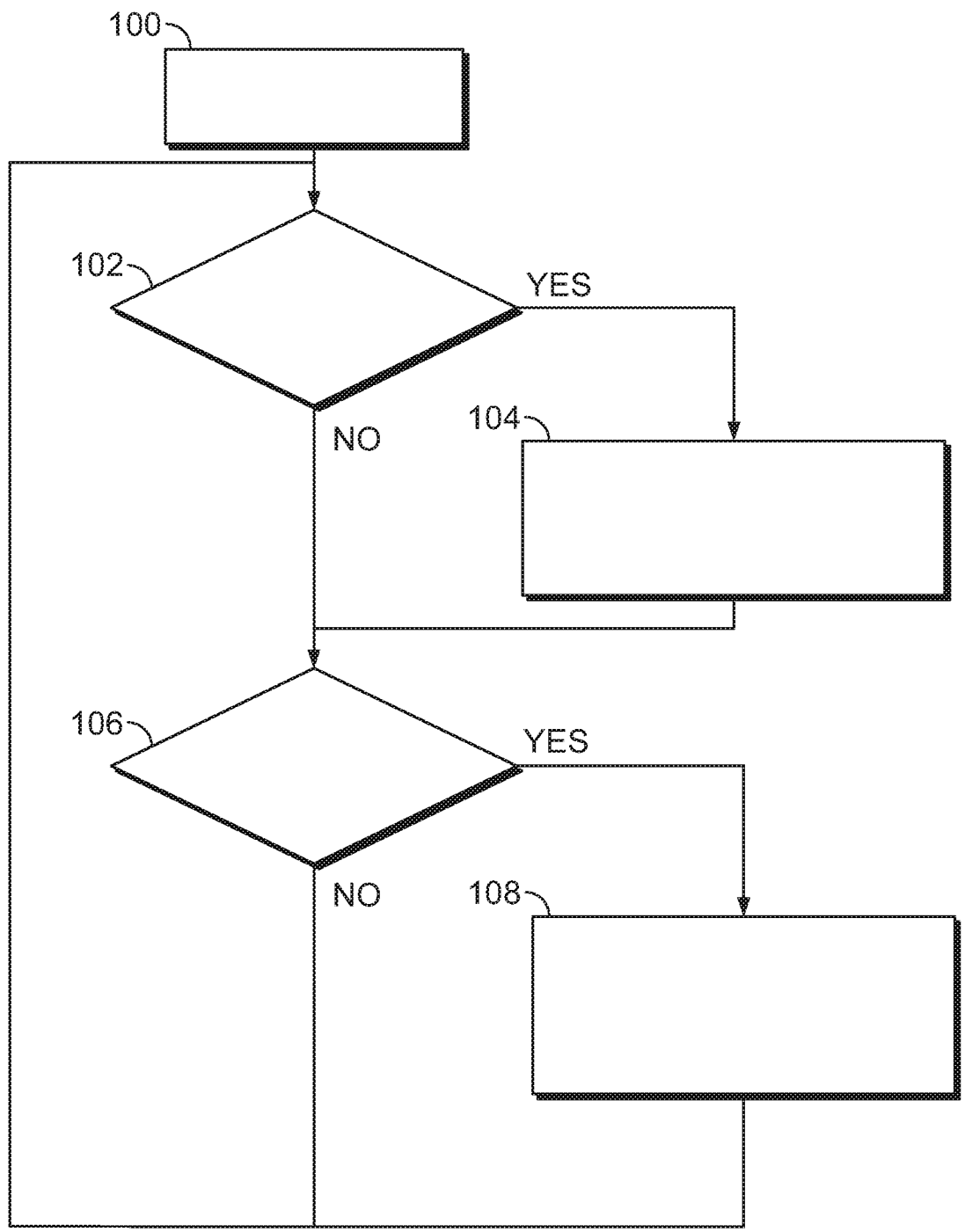
FIG. 3 is a flowchart representation of a method of controlling a lighting assembly according to an embodiment of the present disclosure.

Referring now to FIG. 3, a method of controlling a light assembly according to the present disclosure is illustrated in flowchart form. The method begins with the initiation of a drive cycle at block 100.

A determination is made of whether a first operating condition is satisfied, as illustrated at operation 102. In an exemplary embodiment, the first operating condition refers to the activation of a vehicle brake system, e.g. via actuation of a brake pedal. Satisfaction of the second operating condition may be detected by any suitable means, e.g. a sensor associated with a brake pedal or brake system.

In response to the determination of operation 102 being positive, a first light source is automatically activated and controlled to emit light through an exterior lens, as illustrated at block 104. In the exemplary embodiment of FIGS. 1 and 2, this may be performed via the controller 38 controlling the first light source 26 to activate and emit light through the exterior lens 22. Control then proceeds to operation 106. Likewise, in response to the determination of operation 102 being negative, control proceeds to operation 106.

A determination is made of whether a second operating condition is satisfied, as illustrated at operation 106. In an exemplary embodiment, the second operating condition refers to the activation of a vehicle turn signal, e.g. via actuation of a turn signal lever. Satisfaction of the second operating condition may be detected by any suitable means, e.g. a sensor associated with a turn signal lever.

In response to the determination of operation 106 being positive, a second light source is automatically activated and controlled to emit light through an interior lens, reflect from an interior reflector, and subsequently through an exterior lens, as illustrated at block 108. In the exemplary embodiment of FIGS. 1 and 2, this may be performed via the controller 38 controlling the second light source 28 to activate and emit light through the internal lens 34, reflect from the reflector 36, and subsequently through the exterior lens 22. In embodiments where the second operating condition refers to the activation of a vehicle turn signal, the second light source may be automatically activated and deactivated at intervals to produce a blinking effect. Control then returns to operation 102. Likewise, in response to the determination of operation 106 being negative, control returns to operation 102.

The method thereby automatically controls first and second light sources to emit distinct first and second colors of light through a single colored lens in response to various operating conditions. Moreover, the method controls the light sources independently, i.e. the first light source may be activated while the second light source is deactivated and vice-versa, or they may be activated or deactivated simultaneously. As will be appreciated by one of ordinary skill in the art, other embodiments may utilize different operating conditions and/or different colors of light according to a desired implementation.

As may be seen, the present disclosure provides a system and method for providing multiple colors of lighting through a single colored lens, enabling satisfaction of design criteria and providing an aesthetically pleasing appearance.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a body;
a housing disposed on the body;
an exterior lens coupled to the housing defining a cavity therebetween, the exterior lens having a first color;
an interior lens disposed in the cavity, the interior lens having a second color distinct from the first color;
a reflector disposed in the cavity, the reflector having an at least partially reflective coating disposed thereon and being positioned to reflect light from the interior lens and to the exterior lens;
a first light source configured to emit light having a third color, the first light source being oriented to direct light through the exterior lens without passing through the interior lens;
a second light source configured to emit light having the third color, the second light source being oriented to direct light through the interior lens, reflect from the reflector, and subsequently through the exterior lens, wherein the first color is red and the second color is green, such that light emitted through the interior lens, reflected from the reflector, and subsequently through the exterior lens is emitted as amber; and
a controller in communication with the first light source and the second light source, the controller being configured to automatically activate the first light source independently from the second light source in response to a vehicle brake system being activated, and to automatically activate the second light source independently from the first light source in response to a vehicle turn signal being activated.

2. The automotive vehicle of claim 1, further comprising at least one bezel disposed in the housing, the bezel dividing the cavity into a first chamber and a second chamber, the first light source being disposed in the first chamber, the second light source being disposed in the second chamber, and the reflector being disposed in the second chamber.

3. The automotive vehicle of claim 2, wherein the reflector and a respective bezel of the at least one bezel define a contiguous body.

4. The automotive vehicle of claim 1, wherein the reflector and the interior lens define a contiguous body, a portion of the interior lens defining a substrate of the reflector.

5. A lighting assembly comprising:
a housing;
a first lens coupled to the housing defining a cavity therebetween, the first lens having a first color;
a second lens disposed in the cavity, the second lens having a second color distinct from the first color;
a first light source configured to emit light having a third color, the first light source being oriented to direct light through the second lens;
a reflector disposed in the cavity, the reflector having an at least partially reflective coating disposed thereon, the reflector being positioned to reflect at least a portion of light from the second lens through the first lens;
a second light source coupled to the housing, the second light source being arranged to emit light through the first lens without passing through the second lens; and
at least one bezel disposed in the housing, the bezel dividing the cavity into a first chamber and a second chamber, the reflector being disposed in the first chamber, the second light source being disposed in the second chamber.

6. The lighting assembly of claim 5, wherein the first color is red and the second color is green, such that the portion of light from the first light source emitted from the first lens is amber.

7. The lighting assembly of claim 5, wherein the first light source is disposed in the first chamber.

8. The lighting assembly of claim 5, wherein the reflector and a respective bezel of the at least one bezel define a contiguous body.

9. The lighting assembly of claim 8, wherein the reflector and the respective bezel comprise differing materials, the contiguous body being formed by a multi-shot molding process.

10. The lighting assembly of claim 5, further comprising a controller in communication with the first light source and the second light source, the controller being configured to automatically activate the first light source independently from the second light source in response to a first operating condition, and to automatically activate the second light source independently from the first light source in response to a second operating condition.

11. The lighting assembly of claim 10, wherein the lighting assembly is disposed on an automotive vehicle, wherein the first operating condition comprises a turn signal of the automotive vehicle being activated, and wherein the second operating condition comprises a brake system of the automotive vehicle being activated.

12. The lighting assembly of claim 5, wherein the reflector and the second lens define a contiguous body, a portion of the second lens defining a substrate of the reflector.

13. The light assembly of claim 12, wherein the reflector and the second lens comprise differing materials, the contiguous body being formed by a multi-shot molding process.

14. A method of controlling a light system, comprising:
providing a housing, an exterior lens coupled to the housing to define a cavity therebetween, an interior lens disposed in the cavity, a reflector disposed in the cavity, a first light source disposed in the cavity, a second light source in the cavity, and a controller in communication with the first light source and the second light source, wherein the exterior lens has a first color and the interior lens has a second color distinct from the first color;
in response to a first operating condition, automatically controlling the first light source, via the controller, to emit light through the exterior lens without passing through the interior lens; and in response to a second operating condition, automatically controlling the second light source, via the controller and independently from the first light source, to emit light through the interior lens, reflect from the reflector, and subsequently through the exterior lens.

15. The method of claim 14, further comprising disposing the housing on an automotive vehicle, wherein the first operating condition comprises a turn signal of the automotive vehicle being activated, and wherein the second operating condition comprises a brake system of the automotive vehicle being engaged.

16. The method of claim 14, wherein the first color is red and the second color is green, such that light emitted through the interior lens, reflected from the reflector, and subsequently through the exterior lens is emitted as amber.

* * * * *